Patented Jan. 26, 1926.

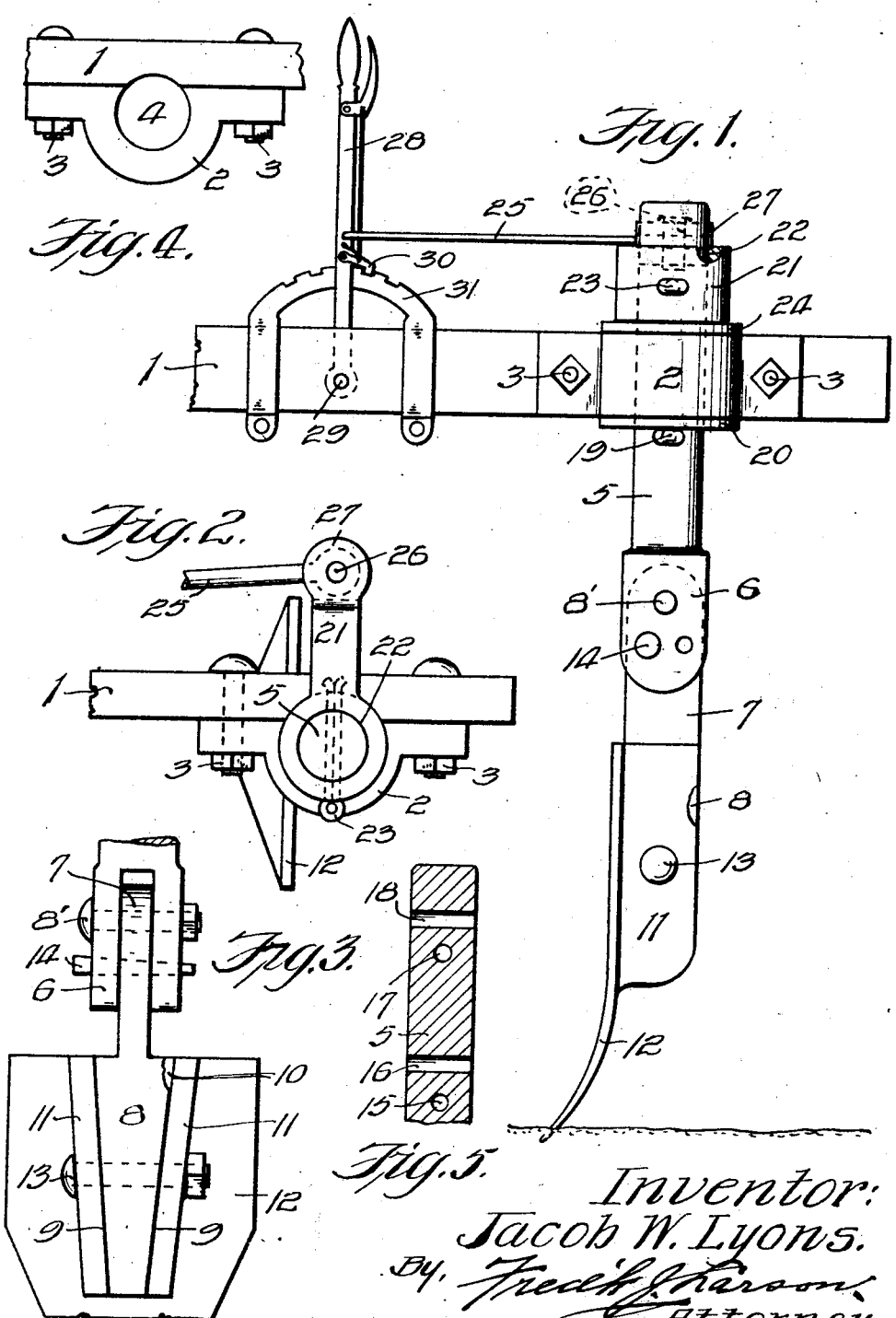

1,570,689

UNITED STATES PATENT OFFICE.

JACOB W. LYONS, OF MORRISONVILLE, ILLINOIS.

CULTIVATOR.

Application filed March 31, 1922. Serial No. 548,515.

*To all whom it may concern:*

Be it known that I, JACOB W. LYONS, a citizen of the United States, residing at Morrisonville, in the county of Christian and State of Illinois, have invented certain new and useful Improvements in Cultivators, of which the following is a specification.

My invention relates to cultivators, and, more particularly to a cultivator shovel, its shank, the means for vertically adjusting the shank with relation to the beam for regulating the depth of the furrow and to means for turning the shovel through the dirt toward, or away from plants growing in rows.

A further object of the invention is to provide a device of the class described which is simple in construction, easily and readily adjusted, durable, comparatively inexpensive in manufacture and highly efficient for the purpose intended.

With the above and other objects in view, the invention consists in the novel features of construction, arrangement and combination of parts hereinafter more fully described and finally pointed out in the claim hereto appended.

Referring to the accompanying drawings forming a part of this specification, wherein like characters of reference denote similar parts throughout the several views:

Fig. 1 is a side elevation of a device constructed in accordance with my invention and shown as applied to a cultivator plow beam.

Fig. 2 is a plan view thereof.

Fig. 3 is a rear elevation of the connection between the shank and cultivator shovel.

Fig. 4 is a detail of the shank bearing.

Fig. 5 is a detail of upper shank section.

Referring to the drawing, the reference character 1 designates a suitable cultivator beam, the side face of which is fixed to a suitable bearing 2 by means of suitable fastening devices 3. The bearing opening 4, is preferably, although not necessarily, drilled after the bearing has been fixed to the beam 1, so that the opening 4 will lie partly within the side face of the beam 1, and partly within the bearing 2, as shown in Fig. 4.

Rotatably journaled within the vertical opening 4 of the bearing 2, is a two-piece cultivator shank consisting of the cylindrical upper shank section 5 which is rotatably receivable in the opening 4 of the bearing 2 and provided with a bifurcated head 6 at its lower end to receive the upper end 7 of the lower shank section 8 which is pivotally connected thereto as at 8'. The lower portion of shank section 8 is tapered by having its side walls 9 inclined. This tapered shank section or head 8 is receivable in a socket 10 formed between two spaced ribs 11 extending rearwardly from the cultivator shovel 12. The shovel 12 is securely, but removably fixed to the tapered shank section 8 by means of a suitable fastener device 13 passing through the ribs 11 and the tapered shank section 8.

To prevent breaking the shank when the shovel strikes a rock, I employ a wooden peg 14 which is receivable in registered openings in head 6 of upper shank section 5 and the upper end 7 of the lower shank section 8. This peg 14 will shear before the shank will break, as is manifest. The upper end 7 of lower shank section 8 is provided with a plurality of openings so that the shovel may be set at various angles, as is manifest.

The upper end of the upper cylindrical shank section 5 is provided with the transverse openings 15, 16, 17 and 18. Openings 16 and 18, it will be observed, run at right angles to openings 15 and 17, so as not to unnecessarily weaken the shank. A cotterpin, or like fastener 19 is shown as passing through the openings 15 and a suitable washer 20 is interposed between the lower face of the beam 1 and the cotter pin 19. This pin 19 prevents the shank 5 from upward movement.

The numeral 21 indicates an arm having an opening 22 at one end to receive the upper end of the shank section 5. A suitable pin 23 holds the arm 22 in fixed relation with shank 5. A suitable washer 24 is interposed between the upper face of the beam and the lower face of the arm 21, as clearly shown in Fig. 1.

By changing the pins 19 and 23 from the openings 15 and 17 of the shank 5 to the openings 16 and 18, it will be observed that the shank 5 will be lowered whereby the depth of the furrow will be greater than when pins 19 and 22 are receivable in the openings 15 and 17. This arrangement permits of quick vertical adjustment of the shank with relation to the beam 1, as is manifest.

25 indicates a pull rod which has connection at one end with a pin 26 carried by the free bifurcated end 27 of the arm 21. The opposite end of the pull rod 25 is connected to a lever 28 which is pivotally connected to the beam 1 by means of the pin 29. The lever is provided with a spring pressed dog 30 for engagement with the teeth of the sector 31, which sector is suitably fixed to the beam 1. This arrangement of parts controls the turning movement of the shank and shovel, as is manifest.

From the foregoing description, it is evident that I provide a device whereby the shank may be moved vertically so that furrows of relatively different depths may be plowed, and whereby the shanks and shovels may be rotated or turned to throw the dirt toward or away from the plants being cultivated.

The many advantages of the herein described invention will readily suggest themselves to those skilled in the art to which it appertains.

I do not desire to be understood as limiting myself to the exact details of construction and arrangement as herein described and illustrated, as it is manifest that variations and modifications may be made without departing from the spirit and scope of my invention and the terms of the following claim, hence I wish it to be understood that I reserve the right to make any such changes, or modifications as may fairly fall within the scope of the appended claim when fairly construed.

What I claim is:

In a cultivator construction, a beam, a vertically disposed concaved recess in the outer side face of the beam, a bearing fixed to the beam having a vertically disposed opening having an open inner side to register with the recess in the beam to provide a circular bearing opening, a shovel shank having a plurality of transverse openings disposed at right angles to each other oscillatingly receivable in said bearing opening, a washer mounted upon the shaft and engaging the lower face of the bearing, a cotter-pin receivable in one of the transverse shaft openings below the washer and engaging the lower face thereof for holding the washer from downward displacement, a washer loosely mounted upon the shaft and engaging the upper face of said bearing, an arm having a head provided with an opening at one end for receiving the upper end of said shaft, the lower face of said arm engaging the washer that engages the upper face of the bearing, a cotter-pin passing through the head of said arm and passing through one of the transverse shaft openings for holding the arm against upward and rotary displacement and means for actuating said arm for oscillating the shovel shank.

In testimony whereof, I have hereunto signed my name to the specification.

JACOB W. LYONS.